United States Patent [19]
Harman et al.

[11] Patent Number: 5,596,672
[45] Date of Patent: Jan. 21, 1997

[54] METHOD AND APPARATUS FOR CONTROLLING THE CONTACT OF OPTICAL FIBERS

[75] Inventors: Murray R. Harman, Gloucester; James D. Marshall, Stittsville, both of Canada

[73] Assignee: Fiberlign Division of Preformed Line Products (Canada) Ltd., Napean, Canada

[21] Appl. No.: 266,205

[22] Filed: Jun. 27, 1994

[30] Foreign Application Priority Data

Mar. 3, 1994 [CA] Canada ................................. 2116934

[51] Int. Cl.$^6$ ................................................. G02B 6/255
[52] U.S. Cl. ........................... 385/147; 385/137; 385/96; 65/501
[58] Field of Search ........................... 385/147, 136, 385/137, 95, 96, 97, 98, 99, 36, 33, 41, 42; 65/509, 501; 73/800

[56] References Cited

U.S. PATENT DOCUMENTS

| | | | |
|---|---|---|---|
| 4,033,668 | 7/1977 | Presby | 385/95 |
| 4,049,414 | 9/1977 | Smith | 65/4.21 |
| 4,152,190 | 5/1979 | Kurosawa et al. | 156/366 |
| 4,199,223 | 4/1980 | Yannoni | 385/134 |
| 4,220,394 | 9/1980 | Tardy | 385/64 |
| 4,266,852 | 5/1981 | Higgins et al. | 385/96 |
| 4,274,707 | 6/1981 | Pacey et al. | 385/139 |
| 4,319,902 | 3/1982 | Hensel | 385/96 X |
| 4,326,870 | 4/1982 | Bendit et al. | 65/4.21 |
| 4,350,867 | 9/1982 | Kinoshita et al. | 219/121.63 |
| 4,416,506 | 11/1983 | Johnson et al. | 385/137 |
| 4,423,923 | 1/1984 | Frazier et al. | 385/45 |
| 4,433,896 | 2/1984 | Frazier | 385/51 |
| 4,487,475 | 12/1984 | Ogawa | 385/95 |
| 4,537,468 | 8/1985 | Degoix et al. | 385/96 |
| 4,548,669 | 10/1985 | Steinmann et al. | 156/358 |
| 4,557,557 | 12/1985 | Gleason et al. | 385/140 |
| 4,561,719 | 12/1985 | Quan | 385/98 |
| 4,662,962 | 5/1987 | Malavielle | 156/158 |
| 4,664,732 | 5/1987 | Campbell, et al. | 156/158 |
| 4,687,287 | 8/1987 | Lukas et al. | 385/134 |
| 4,695,306 | 9/1987 | Kakoun et al. | 65/1.52 |

(List continued on next page.)

FOREIGN PATENT DOCUMENTS

| | | |
|---|---|---|
| 0151008 | 8/1985 | European Pat. Off. . |
| 53-149655 | 5/1978 | Japan . |
| 62014606 | 1/1987 | Japan . |
| 2015208 | 1/1990 | Japan . |
| 2084604 | 3/1990 | Japan . |
| WO91/03751 | 3/1991 | WIPO . |
| WO92/16860 | 10/1992 | WIPO . |

OTHER PUBLICATIONS

"Arc–fusion Splicing of Single Mode Fibers 2: A Practical Splice Machine", Applied Optics, vol. 21, No. 11, Jun. 1, 1982.

"Fusion Splices for Single–Mode Optical Fibers", IEEE Journal of Quantum Electronices, vol. QE–14, No. 8, Aug. 1978.

S. Kaneko, et al., "Multi–Channel SM–Fiber Pigtail Transmitter/Receiver Modules using Planar Micro Lens Array Coupling", European Conference on Optical Communication, 19th Meet., Sep. 12–16, 1993, Montreux, Switzerland, pp. 413–416.

*Primary Examiner*—John D. Lee
*Assistant Examiner*—Phan T. H. Palmer
*Attorney, Agent, or Firm*—Fay, Sharpe, Beall, Fagan, Minnich & McKee

[57] ABSTRACT

A method and apparatus for placing two optical fiber ends or, one optical fiber end and another object, in contact with one another is provided. The method involves moving one of an optical fiber and an object toward one another so that they make contact with one another and apply a loading force upon one another. A load sensing device detects the loading force and provides a signal indicative of the load sensed. The invention is particularly useful for placing two optical fiber ends in contact with one another so that predetermined force applied to the optical fiber ends.

13 Claims, 3 Drawing Sheets

U.S. PATENT DOCUMENTS

| | | | |
|---|---|---|---|
| 4,727,237 | 2/1988 | Schantz | 219/121.63 |
| 4,735,481 | 4/1988 | Lukas et al. | 385/139 |
| 4,736,632 | 4/1988 | Case | 73/827 |
| 4,758,061 | 7/1988 | Horn | 385/62 |
| 4,790,617 | 12/1988 | Campbell et al. | 385/97 X |
| 4,810,054 | 3/1989 | Shinbori et al. | 385/96 |
| 4,832,438 | 5/1989 | Engel et al. | 385/63 |
| 4,877,303 | 10/1989 | Caldwell et al. | 385/65 |
| 4,906,810 | 3/1990 | Sharma et al. | 219/121.46 |
| 4,911,524 | 3/1990 | Itoh et al. | 385/97 |
| 4,920,366 | 4/1990 | Bowen et al. | 385/55 |
| 4,947,693 | 8/1990 | Szuchy et al. | 73/800 |
| 4,964,688 | 10/1990 | Caldwell et al. | 385/66 |
| 4,964,689 | 10/1990 | Wichansky | 385/66 |
| 4,969,705 | 11/1990 | Stoy et al. | 385/96 |
| 5,002,351 | 3/1991 | Szanto et al. | 385/96 |
| 5,011,259 | 4/1991 | Lieber et al. | 385/97 |
| 5,095,519 | 3/1992 | Dorsey | 385/137 |
| 5,134,470 | 7/1992 | Ravetti | 385/98 |
| 5,218,184 | 6/1993 | Hakoun et al. | 385/96 |
| 5,249,247 | 9/1993 | Whitesmith | 385/97 X |

METHOD AND APPARATUS FOR CONTROLLING THE CONTACT OF OPTICAL FIBERS

FIELD OF THE INVENTION

This invention relates generally to the placement of an optical fiber end in contact with another object and more particularly, the invention provides a method and apparatus for placing two optical fiber ends or, one optical fiber end and another object, in contact with one another.

BACKGROUND OF THE INVENTION

There are many situations where it is necessary to contact an end of an optical fiber with another object. For example, before splicing two optical fibers together, their ends must be aligned and placed in contact with one another. Caution must be exercised as the ends are moved into a position where they contact one another so that the ends do not collide with too great a force thereby damaging them. However, it is necessary to provide enough force upon the ends at fusion, a time at which the ends are molten, to ensure some overrun of the fiber ends. If on the other hand, the ends are loosely coupled, they will pull apart in the instance of fusion, resulting in a poor splice joint. While some commercially available fusion splicers have an overrun mechanism that can physically advance the fibers to ensure overrun, the mechanism is bulky, complicated and expensive, and relies on operator visual inspection and/or video image processing for initial placement of the fiber ends.

One of the most common ways of positioning two optical fiber ends near, or in contact with one another, for fusion splicing, uses a visual aid such as a microscope to assist an operator in manually performing this task. U.S. Pat. No. 5,002,351 entitled Fusion Splicer for Optical Fibers, in the name of the applicant Murray R. Harman and Attila J. Szanto, issued Mar. 26, 1991, describes such a system including a microscope for placement of optical fiber ends in contact before fusion. In other more complex systems microprocessor driven video imaging is provided for positioning optical fiber ends.

Other methods and devices for connecting (splicing) or contacting optical fibers are known, for instance from U.S. Pat. No. 4,049,414 to Smith, 4,199,223 to Yannoni, 4,906,810 to Sharma, 4,978,431 to Clark et al, 4,598,669 (Steinmann et al) 4,964,689 (Wichansky), and 4,220,394 (Tardy).

Although these systems do in some manner, perform their intended function, they are expensive and sometimes contribute to inadequate, inconsistent splice joints. Moreover, these and other visually based systems produce results that may vary with the level of an operator's skill.

Therefore, it is an object of this invention, to provide a system that yields repeatable uniform results independent of an operator's skill level.

It is another object of the invention to provide a system for placing an optical fiber in contact with another object wherein the force applied therebetween is less than or equal to a predetermined amount of force.

It is yet another object of the invention to provide a means of micro-positioning optical fiber ends in contact without visual interaction and without image processing.

STATEMENT OF THE INVENTION

In accordance with the invention there is provided, a method of positioning an optical fiber relative to an object comprising the steps of removably securing at least a portion of the optical fiber or the object to a load sensing means;

relatively moving one of the fiber and the object toward one another to allow an end of the fiber to make contact with and apply a loading force upon the object; and, detecting the loading force with the load sensing means.

In accordance with another aspect of the invention, there is provided a method of positioning an optical fiber relative to an object, comprising the steps of:

removably securing at least a portion of the optical fiber or the object to a load sensing means, relatively moving one of the fiber and the object toward one another to allow an end of the fiber to make contact with the object while applying a loading force upon one of the fiber and the object, and monitoring the loading force with the load sensing means to detect a condition at which the fiber and the object contact each other with a predetermined load.

In accordance with yet another aspect of the invention, there is provided a system for positioning a fiber relative to another object, comprising:

a load sensing means;

means for securing one of the fiber and the object to the load sensing means;

means for relatively moving the fiber and the object toward one another along a predetermined path; and, control circuitry for monitoring the load sensing means to either detect a value of a load or force, applied between the fiber and the object at the point of contact therebetween, or to provide an accurate load (preload), or force at said point of contact.

In one embodiment of the invention, the object is another optical fiber and the predetermined path is an axial path defined be the end portions of the fibers.

The object may also be a semiconductor die, a prism, a lens or another optical or semiconductor element.

BRIEF DESCRIPTION OF THE DRAWINGS

Exemplary embodiments of the invention will be described in conjunction with the drawings in which.

DETAILED DESCRIPTION

As indicated above, there is a need for a device that would enable the detection of a collision between an optical fiber and another object with a predetermined accuracy. While the prior art has concentrated on the optical detection of such a condition, the present invention is based on the detection, and or application of a force between the fiber and the object, the force being usually monitored in relation to a predetermined value. In this manner, it is possible to achieve one of the following conditions: 1) a condition when the fiber is being manipulated by an operator under "closed loop" conditions (without subjective visual inspection) e.g. to maximize a transmitted signal, and a collision between the fiber and the object is detected; 2) a condition where the fiber, and the object, after being contacted with each other, are still advanced towards each other until a predetermined (axial) load, so-called preload, is established at the interface to accomplish an overrun during subsequent fusion.

Figure 1:
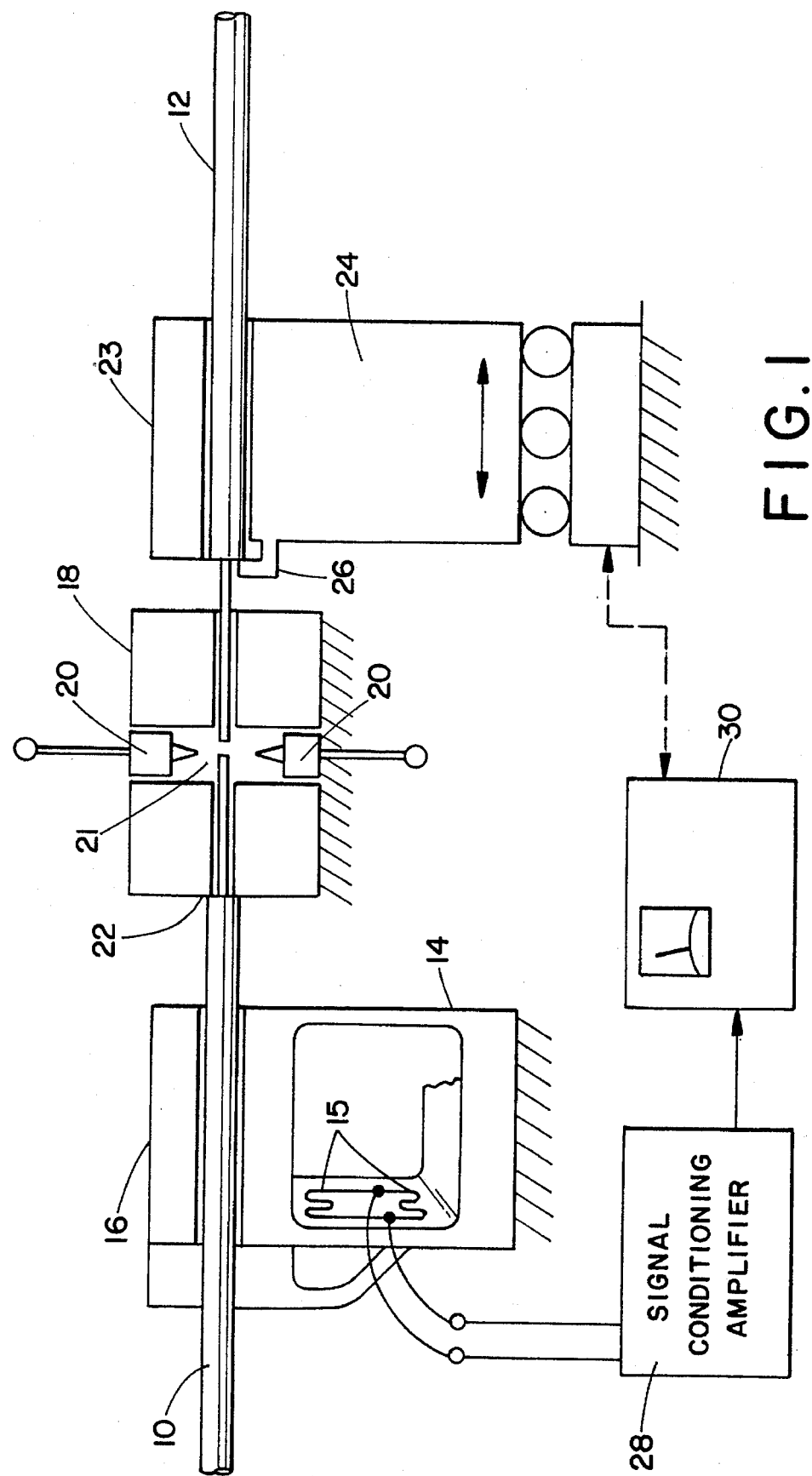
FIG. 1 is a schematic illustration of an embodiment of the system of the invention for contacting two optical fibers.

Turning now to the drawings, FIG. 1 shows a system for contacting and splicing two optical fibers 10 and 12. Fiber 10, with its end portion stripped, is removably secured to a stationary flexure load cell 14 having a strain gauges 15 or other stress-strain sensitive elements. Fiber clamping means 16 are provided to secure the fiber 10 to the cell 14. The stripped end of the fiber 10 is shown inserted into an alignment element 18 that comprises an alignment groove broken at a splicing area 21, and two electrodes 20 protruding into the splicing area 21. The axial groove of the element 18 has a reference edge that serves as an abutment surface 22 for the cladding of the fiber 10 when inserted into the alignment groove.

The other fiber 12 is mounted and removably secured, by way of clamping means 23, to a stage 24 that is movable in a longitudinal direction z defined by the axis of the fibers. The mechanism 24 has an abutment 26 that serves as a positioning stop for fiber insertion. The fibers 10 and 12 are held in the alignment groove by holddown elements (not shown).

The strain gauges 15 of the flexure load cell 14 are connected to a signal conditioning amplifier 28 that processes and transfers signals from the strain gauges 15 to a control unit 30 that includes a user feedback mechanism and/or automated control means.

The alignment element 18 can be substituted with a precision alignment mechanism having suitable fiber positioning means to allow movement/alignment along the x and y axis, perpendicular to the axis of the fiber.

Figure 2:
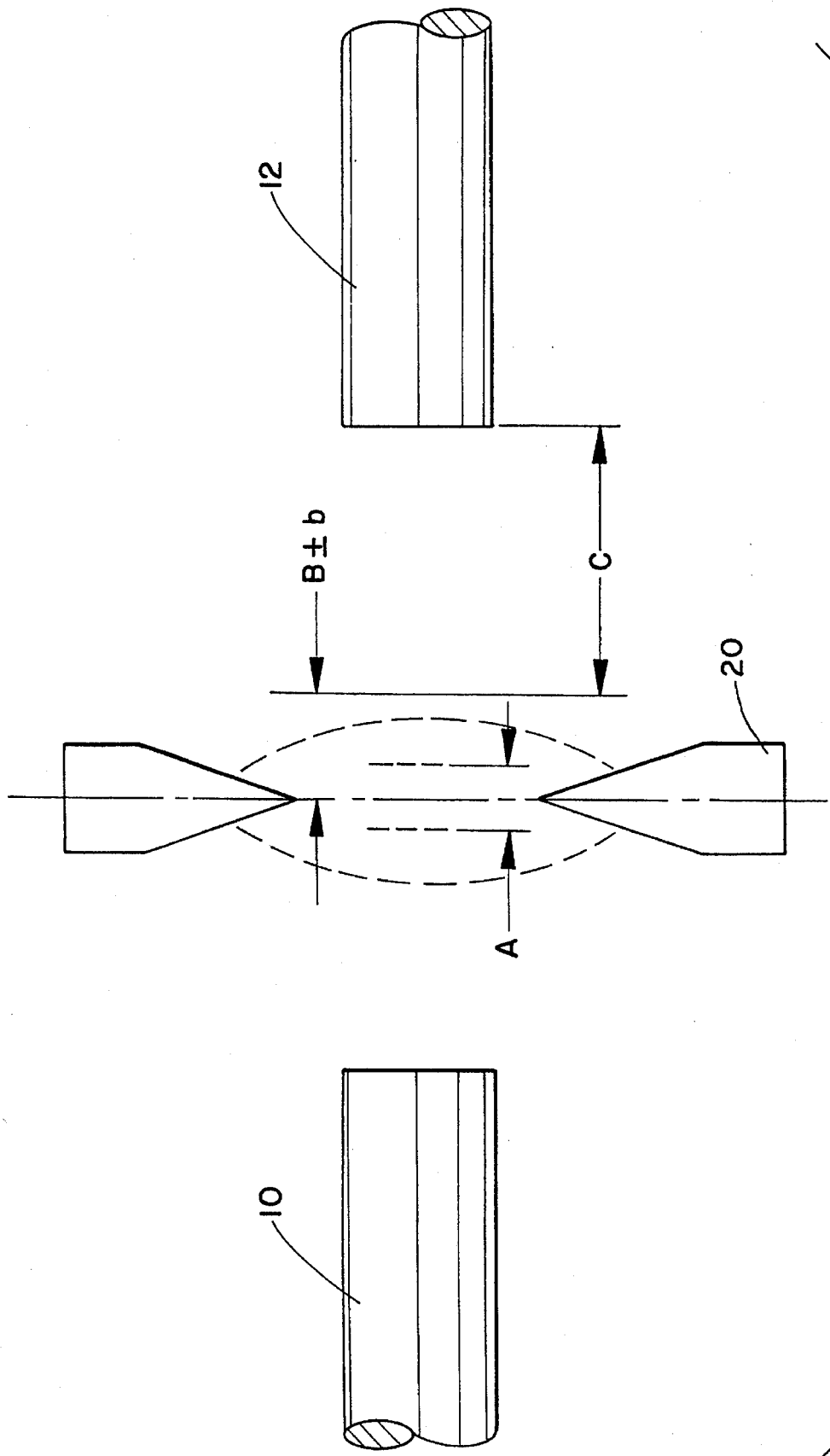
FIG. 2 shows an enlarged section "a" of FIG. 1.

In operation, the load cell 14 and the micro-positioning mechanism 24 are first energized and initialized. End portions of the two fibers 10 and 12 are prepared by stripping to a predefined length "C" as shown in FIG. 2. Fiber 10 is placed in the clamping means 16, positioned along the Z axis to touch the abutment 22 in the alignment element 18 and clamped in place. Fiber 10 is thereby located within a tolerance "A" of the centerline of electrodes 20 which ensures that the fiber is within the area when the electrodes are activated as illustrated in FIG. 2.

Next the second fiber 12 is placed in the clamping means 23 so that it engages the abutment 26 of the movable stage 24, wherein the end of the fiber 12 is positioned within an initial distance B ±b from the other fiber end. The distance, or gap, is usually in the order of 0.50 mm. This position is determined by the initial/reset position of movement stage 24.

The movable stage is now advanced slowly along the Z axis toward the electrode centerline and the output of the load cell 14 is monitored via the amplifier 28 and control unit 30 to detect the load caused by the collision of the two fiber ends.

Once a desired load value is detected, the advancement of the movable stage is terminated.

Upon a load occurring at the contact interface between the fibers 10 and 12, the load cell undergoes a distortion that is shown in an exaggerated manner in phantom lines. The typical deflection of the cell is in the order of a few micrometers. The stiffness of the load cell 14 is such that it allows an amount of deflection that is equivalent to about half of the average required amount of overrun for a given load. This stiffness is in the order of 2 microns per gram. The balance of the axial compression is taken up in the limited axial stiffness of the fiber itself.

The system of the invention allows for a prefusion of the fibers, i.e. a short application of the arc energy on separated ends of the fibers to remove "debris" that is usually present at the stripped ends of optical fibers; the ends so "cleaned" are then more suitable for actual fusion. This is accomplished by bringing the two fiber ends to a contact without any significant load, then separating the ends by a predetermined distance suitable for applying the short-time prefusion arc across the fiber ends. The system can be adapted to move automatically the fiber and the object away from one another after a load exceeding a predetermined value has been detected at the interface, or contact surface.

The fiber ends are then brought back into contact and the load cell 14 output is monitored via user feedback mechanism 30 until a predetermined load is established. The load would be in the order of 3 grams and would be sufficient preload to accomplish the required overrun during fusion. Fusion would then take place.

As an alternate embodiment of FIG. 1, the fiber abutment surfaces 22 and 26 could be omitted having the fiber set-up positions controlled by visual feedback via microscope or other imaging system. The load cell 14 could be likewise mounted to a stage moveable in the Z direction to allow position control, of either one or both fibers. The stripped length of fiber would be less critical in this case.

Figure 3:
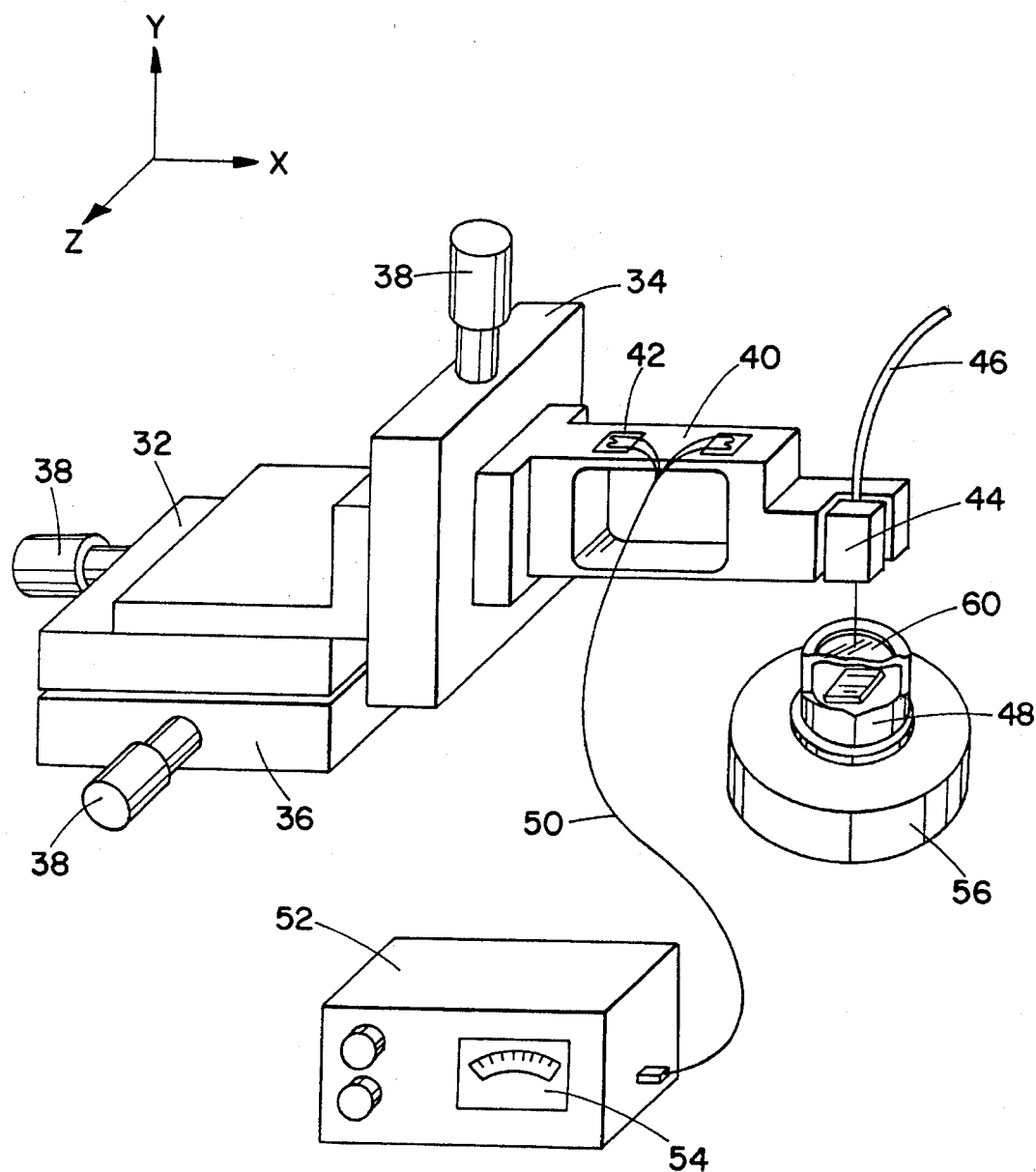
FIG. 3 shows another embodiment of the system.

FIG. 3 shows an embodiment of the invention adapted to contact one end of an optical fiber with another element such as a silicon die, a prism, a lens or an optical waveguide substrate, or to manipulate the position of the fiber end during a process operation known as pigtailing of semiconductor devices. In the latter process, care must be exercised to avoid excessive force between the end of the fiber and the semiconductor surface to eliminate physical damage to the contacted surface.

In FIG. 3, three positioning stages, 32, 34, and 36 are shown as assembled for movement in three coordinate axes, X, Y, and Z, respectively. The movement is effected manually by means of respective micrometer heads 38 to enable an operator to control the contact load with a sub-gram accuracy. A load cell stage 40 is fixed to the positioning stage 34 and has a load sensing device 42 such as a strain gauge, bonded metal film, piezo element or another strain-sensitive element mounted thereon. The load cell stage 40 includes a fiber clamping means 44. An optical fiber 46 is shown secured by the clamping means 44 to the stage 40. A stripped end portion of the fiber 46 extends towards a semiconductor device 48 to be pigtailed. The input signal from the strain gauge (or another strain-sensing element) is passed via a line 50 to a control unit 52 that includes a signal conditioning amplifier and a user interface 54 to indicate a collision at the fiber end.

The semiconductor device 48 is mounted removable on a fixed socket 56. The stripped end of the fiber 46 is positioned up to a viewing window or lens 60 of the semiconductor device, and a contact therebetween is detected by the load sensing device 42 and the read out via the control unit 52.

Another example of the object to which the fiber 46 can be positioned or pigtailed is a semiconductor die or another optical waveguide.

The system shown in FIG. 3 enables an operator to position an optical fiber relative to a semiconductor device, e.g. when a signal path is optimized (maximized) by the operator so as to achieve maximum light transfer.

A datum height in the "Y" direction can be safely established at the point of collision between the end of the fiber 46 and the surface impinged thereby.

In tests conducted to validate the invention, it has been demonstrated that a load cell of sufficient resolution can be used to measure a fiber contacting a semiconductor die or another "sensitive" object. It is possible, with the system of the invention, to detect a collision to better than 1 micron resolution with subgram fiber end loading.

The apparatus of the invention may likely eliminate the need for subjective visual inspection wherein the operator would have no means of accurately determining the magnitude of force involved in a collision.

In an automated embodiment of the invention, not illustrated, the manual stages 32, 34, and 36 could be replaced for instance with stepper-motor driven lead screw stages.

It is an advantage of the invention that the use of the load sensing means could eliminate the need for "machine vision" system to "see" the fiber end and the impinged surface.

Numerous other embodiments of the invention may be envisaged by those versed in the art, without departing from the spirit and scope of the invention as claimed.

What we claim is:

1. A method of positioning an optical fiber having an end in contact with an object comprising the steps of:

removeably securing at least a portion of the optical fiber or the object to a load sensing device;

relatively moving one of the fiber and the object toward one another to make contact and establish a loading force between the end of the fiber and the object; and, detecting the loading force with the load sensing device, wherein the step of detecting includes detecting the loading force with a piezo-electric device.

2. A method of positioning an optical fiber having an end in contact with an object comprising the steps of:

removeably securing at least a portion of the optical fiber or the object to a load sensing device;

relatively moving one of the fiber and the object toward one another to make contact and establish a loading force between the end of the fiber and the object; and, detecting the loading force with the load sensing device, wherein the detecting step includes the step of monitoring the loading force with the load sensing device to detect a condition at which said end of the fiber and the object contact each other with a predetermined load.

3. A system for positioning an optical fiber having an end portion in contact with an object comprising:

a loading sensing device;

means for securing one of the fiber and the object to the load sensing device;

means for relatively moving the end portion of the fiber and the object toward one another along a predetermined path; and, indicia for displaying a loading condition between the end portion of the fiber and the object detected by the load sensing device.

4. A system for positioning a first optical fiber having an end portion relative to an object, comprising:

a load sensing means;

means for securing a one of the first fiber and the object to the load sensing means;

means for moving the end portion of the first fiber and the object relative to one another along a predetermined path; and, control circuitry for monitoring the load sensing means to detect a value of a force between the end portion of the first fiber and the object at a point of contact therebetween.

5. The system as defined in claim 4, further including indicia for displaying said value of said force.

6. The system as defined in claim 4 wherein:

the object is a second optical fiber having an end portion; and, the predetermined path is an axial path defined by the respective end portions of the first and second optical fibers.

7. The system as defined in claim 4 wherein the object is a one of a semiconductor die, a prism, a lens and an optical semiconductor element.

8. The system as defined in claim 4, wherein the means for moving includes means for automatically moving the end portion of the first fiber and the object away from one another after a load exceeding a predetermined force has been detected.

9. The system according to claim 4 wherein the control circuitry includes means for providing a predetermined preload between said end portion of the first fiber and the object at said point of contact.

10. The system as defined in claim 4 wherein the load sensing means is a one of a strain gauge device and a piezo-electric device.

11. The system according to claim 4 wherein the means for moving the end portion of the first fiber and the object are micro-positioning stages moveable in three dimensions.

12. A method of controlling contact of optical fibers comprising:

relatively moving a first fiber end and a second fiber end;

contacting said first fiber end and said second fiber end to establish a load force therebetween;

generating a signal representative of said load force, wherein the step of generating said signal includes deflecting a flexure load cell;

fusing said first fiber end with said second fiber end; and, while fusing, relatively moving said first fiber end and said second fiber end by an overrun distance.

13. The method according to claim 12 wherein the step of deflecting said flexure load cell includes deflecting said flexure load cell by said overrun distance.

* * * * *